United States Patent
Albert et al.

[11] Patent Number: 5,812,353
[45] Date of Patent: Sep. 22, 1998

[54] CURRENT LIMITER FOR ELECTRICAL TRANSMISSION/DISTRIBUTION PROTECTION SYSTEMS

[75] Inventors: Gary W. Albert, Jamul; Kenneth B. Muehleman, San Diego, both of Calif.

[73] Assignee: Lockheed Martin Corporation, Bethesda, Md.

[21] Appl. No.: 730,080

[22] Filed: Oct. 15, 1996

[51] Int. Cl.$^6$ .................................. H02H 9/00; H02H 7/00
[52] U.S. Cl. ............................... 361/58; 361/19; 361/63; 361/98; 361/107; 323/363
[58] Field of Search ......................... 361/58, 19, 62–63, 361/107, 93, 94, 98; 323/360, 363

[56] References Cited

U.S. PATENT DOCUMENTS 4,490,769  12/1984  Boenig ........................................ 361/58

*Primary Examiner*—Jeffrey A. Gaffin
*Assistant Examiner*—Michael J. Sherry
*Attorney, Agent, or Firm*—John R. Duncan

[57] ABSTRACT

A current limiter arrangement particularly adapted to be positioned at a substation of an electrical power system for limiting the fault current for a predetermined period of time to permit protective devices positioned downstream in the network to clear the fault. If the fault is not cleared and the fault persists for a predetermined period of time the current limiting arrangement acts as a circuit breaker to open the load circuit. The arrangement includes an SCR bridge having a superconducting coil connected across two nodes. A novel gate pulse firing circuit generates two pulses per ac cycle for application to the gates of the SCR's of the bridge at 90° and 270° of each 360° cycle and is ON at all times to provide for prompt dc charging of the super conducting coil with no ac load current and non-fault conduction of ac current at less than the maximum current limit. The gate pulse firing circuit by staying ON at all times also provides current limiting under the fault condition and recovery of the dc superconducting coil current after the fault is cleared by a downstream protective device and is turned OFF only after a predetermined period of time for opening of the load circuit.

21 Claims, 3 Drawing Sheets

CURRENT LIMITER FOR ELECTRICAL TRANSMISSION/DISTRIBUTION PROTECTION SYSTEMS

BACKGROUND OF THE INVENTION

The present invention relates generally to the field of protection systems for electrical transmission/distribution networks and more particularly, but not by way of limitation, to an improved current limiter arrangement for limiting fault current to preclude premature actuation of an associated circuit breaker.

It is well known that the continued growth of electrical power generation and transmission systems has resulted in higher levels of available fault currents and correspondingly greater demands on system protective components. It is common for electrical utility systems today to be faced with fault currents higher than the momentary and interrupting capabilities of the installed equipment.

Developing higher current interrupting rated circuit breakers and retrofitting existing power systems therewith is prohibitively costly while restructuring power system networks to reduce available fault currents destroys the advantages associated with tightly interconnected generation and transmission networks. Accordingly, the desirability of fault current limiters compatible with and insertable into present power system networks is clearly seen, as long as such current limiters are simple, reliable, cost effective, and commercially viable.

Protection and coordination of an electric power system is basically a function of fault current magnitudes and time. All circuit breakers from a small fuse up to very large transmission type breakers have to be coordinated with each other in such a way as to minimize the area of power outage in the event of a short circuit occurring. For example, a substation should not shut off and leave a whole square mile without power just because of a short circuit in one warehouse unless all the circuit protection devices along the way are failing.

A 12 to 16 kV substation breaker, which size is typical for distribution systems, has to stay on long enough for the next circuit breaker or fuse down the line to open and clear the fault. Likewise, this breaker down the line has to stay on line long enough such that the next breaker that is even closer to the fault has time to open. Thus, the substation breaker has to stay on the longest and only open when the fault current persists and all other breakers or fuses are not doing their jobs in their allotted times.

A typical distribution substation breaker has three phase relays and a ground relay. These relays detect either a phase-to-phase or a phase-to-ground fault and after a preset time delay send a signal to the breaker to open up. The higher a short circuit current is above the minimum trip current the less time delay before the breaker receives a signal. The total time from occurrence of a fault until the breaker is opened is the time delay of the relay, which is a function of the relay setting and current, plus the reaction time of the breaker. A typical 12 to 16 kV breaker takes up to 83 milliseconds after receiving a signal to open. While the times are different for the breakers involved in subtransmission and transmission systems of higher voltages the principles remain the same.

A breaker then has to be able to withstand the maximum allowed short circuit current for a determined time period before opening. Accordingly, a fault current limiter should reduce the current to slightly below the maximum allowed short circuit to have it open in the shortest time possible. If the current is limited to below the relay minimum trip current, the breaker will never open.

A method of controlling currents in relatively small ac circuits was developed in the 1940's using a transductor. Such an approach proved impractical in larger power systems. In order to resolve some of the problems associated with the transductor, it was proposed by K. C. Darton in "A New Power System Current Limiter," Electrical Review International, Vol. 202, No. 5, February, 1978 to provide a superconducting current limiting circuit having a superconducting coil which controlled the dc bias current in a transductor connected in series with the ac power line. While the Darton proposal eliminated many of the shortcomings of the previous approaches associated with the transductor it was found in implementation that the transductor was a very bulky and costly component.

To overcome the recognized shortcomings of the prior art, it was then proposed by H. J Boenig in U.S. Pat. No. 4,490,769 issued Dec. 25, 1984 to provide a solid-state circuit breaker apparatus having a current limiting characteristic and using a superconducting coil. The Boenig system provided a solid state circuit breaker having a dc biased superconducting coil interposed across opposing nodes of the thyristor bridge with the remaining opposed nodes of the bridge being connected in series with a load impedance and an ac source having a source impedance. In the event of a fault associated with the load impedance, the Boeing solid state breaker would act initially to reduce the ac line current to zero as rapidly as possible. The thyristors of the bridge were left in a non-conducting state thereby eliminating the need for a circuit breaker. If there was temporary overload, the Boenig system permitted a controlled current condition to continue for a short period before taking the drastic action of interrupting the circuit.

Boenig further teaches gate circuitry for the thyristor bridge which provides one pulse per ac cycle to the gate of each thryristor to turn each thyristor ON during the charging of the superconducting coil and thereafter such pulsing of the gate of each of the thyristors is suspended. Also, after the Boenig system has acted as a circuit breaker and the thyristors of the bridge were placed in a non-conducting state it is necessary to recommence the charging procedure again with the concomitant time delay and the difficulties associated with such delay by other elements of the associated electrical transmission/distribution network.

An improved approach is believed to be that of a solid state current limiter using a superconducting coil and which is directed to the function, in the event of a fault associated with the load impedance, of limiting the fault current for a predetermined period of time to permit all downstream electrical protection devices associated with the load impedance the opportunity to perform their protective functions before proceeding to act as a circuit breaker. Thus, a temporary fault problem is promptly resolved by associated electrical protection devices before actuating a sub-station circuit breaker and possibly initiating a cascade effect that would shut down a significant portion of an electrical transmission/distribution network.

It is a general object of the present invention to provide an improved current limiter having a superconducting coil interposed in a power semiconductor device bridge arrangement for initially limiting a fault current for a predetermined period of time to permit the fault to be cleared before acting as a circuit breaker.

It is a further general object to provide an improved current limiter which quickly provides for start of the current limiter protection system and for immediate recovery of such system upon clearing of the fault.

It is yet a further object of the invention to provide an improved current limiter that is simple, low cost, and which may be easily implemented in an electrical transmission/distribution network to provide suitable protection between a distribution transformer and a load impedance.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of he preferred embodiment in addition to the scope of the invention defined by the claims taken in conjunction with the accompanying drawings.

SUMMARY OF THE INVENTION

Briefly stated, the present invention contemplates an arrangement to limit current through a load circuit that is supplied electrical current from an ac source having a source impedance, such as the secondary of a distribution transformer of an electrical transmission/distribution network, in the event of a fault occurring in the load circuit for a predetermined time in order to permit the fault to be cleared before acting as a circuit breaker to disconnect the load circuit. The arrangement includes a power semiconductor device bridge circuit interposed between the ac source and the load circuit with the bridge having four legs and four nodes with first and second nodes being connected in series with the ac source and the load circuit. A power semiconductor device is interposed in each leg and is provided with a gate for turning ON the device. A superconducting coil having an impedance that is large with respect to the ac source impedance is connected across the other opposing nodes of the bridge circuit in series with a dc source having voltage and current levels sufficient to forward bias each leg of the power semiconductor device bridge to permit bidirectional current flow therethrough at a desired maximum current level generated by said ac source.

A gate pulse generating means is coupled to the gate of each power semiconductor device for application of two 180° spaced gate pulses during each cycle of said ac source to readily accomplish the initial charging of the superconducting coil means and to promptly provide for recovery charging of the superconducting coil means after clearing of a fault in the load circuit.

The gate pulse generating means includes a circuit means to generate a plurality of trains of spaced gate pulses and a determinable switch array means coupled to the gate pulse circuit means to determine the pulse width and spacing of such pulses. The gate pulse circuit means is coupled to the power semiconductor devices of the bridge to increase the power of the gate pulses generated by the gate pulse generating means and to isolate the gate circuits of the power semiconducting devices from the low voltage and low current signals of the control switch array means.

In the event the load circuit experiences a fault, the current limiter of the present invention is operative to switch the power semiconductor devices of the bridge circuit so that the large impedance of the superconducting coil is directly interposed in the load circuit and the initial fault current is immediately reduced to a predetermined fraction of such initial fault current for a predetermined time period to permit the fault to be cleared or be taken off line so as to protect the integrity of the entire electrical transmission/distribution system. If the fault is not cleared within this predetermined time the fault current limiter may be used as a circuit breaker by terminating the application of gate pulses to the gates of the power semiconducting devices to open the circuit. If the fault is cleared within this predetermined time period, since the gate pulses are already being applied to the gate circuit of each power semiconducting device, the arrangement can quickly and smoothly resume its quiescent state.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other arrangements and methods for carrying out the same purposes of the present invention. It should also be realized by those skilled in the art that such equivalent arrangements and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE INVENTION

Figure 1:
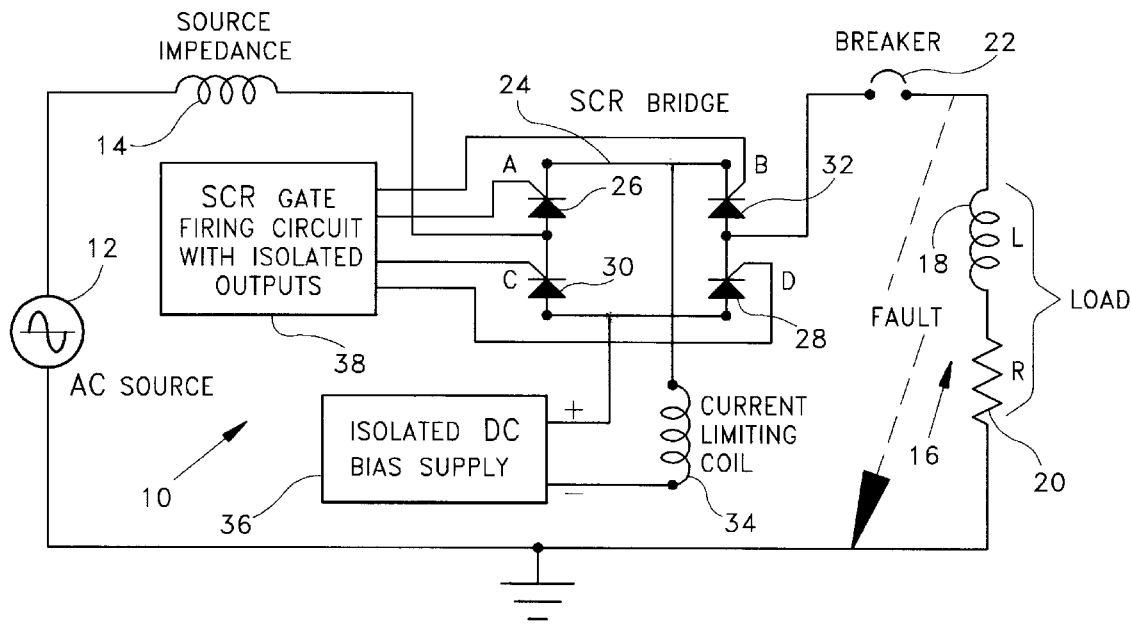
FIG. 1 is a simplified schematic of a current limiting arrangement for an electrical transmission/distribution application constructed in accordance with a preferred embodiment of the invention.

Referring now to the drawings in detail, reference character 10 generally designates a current limiter arrangement for an electrical transmission/distribution network that has been constructed in accordance with a preferred embodiment of the invention. The present invention represents an improvement over the solid state circuit breaker using a superconducting coil of U.S. Pat. No. 4,490,769 the disclosure of which patent is incorporated herein by reference. An ac source 12 having a source impedance 14 is coupled to a load 16 having an inductance 18 and a resistance 20 through the current limiter arrangement 10. A suitable circuit breaker 22 is interposed between the current limiter 10 and the load 16.

In actual application, the ac source 12 and the source impedance 14 would be considered to be the secondary of a step down transformer, having a typical 12–16 kV size, of an electrical transmission/distribution network with the current limiter 10 being disposed in the physical vicinity of the ac source 12 and with the load being considered that portion of an electrical distribution extending electrically downstream of the main step down transformer. As such, it should be considered that the load 16 is considered to be representative of a larger distribution network that may include further loads, transformers, and further protective devices as circuit breakers and relays. A suitable circuit breaker 22 is serially interposed in the circuit with the ac source 12 and the load 16.

The novel current limiter of the present invention includes a power semiconductor bridge 24 having a suitable power semiconductor device or strings of such devices connected in each of the four legs. The four legs may be considered to comprise power semiconductor devices 26, 28, 30 and 32. The bridge 24 is connected in series with the ac source 12 and the load 16 by means of a first connection at one node of the bridge 24 between devices 26 and 30 and a second connection at an opposing second node between devices 28 and 32. The power semiconductor devices may be of any type suitable for the voltage, current and power requirements of the particular application. A device which has been satisfactorily used in a preferred embodiment of the invention is a silicon controlled rectifier (SCR). While each SCR 26, 28, 30 and 32 has been shown as a single device, it is understood that in actual practice each SCR may comprise a series and/or parallel network of SCR's.

A suitable current limiting coil 34 and an isolated DC bias supply 36 are serially connected to a third node of the bridge 24 between devices 26 and 32 and to an opposing fourth node of the bridge 24 between devices 28 and 30. Under normal operating conditions the dc voltage biasing source 36 induces a current through the current limiting coil and back through the devices 26, 28, 30, and 32 at such a value as to exceed the peak acceptable operating current of ac power source 12. In such a normal operating condition the voltage biasing source 36 biases each of the devices 26, 28, 30 and 32 such that the ac current supplied by the ac power source 12 can flow bidirectionally therethrough to the load 16 with very low impedance.

As is common with power semiconductor devices such as SCR's, each SCR is provided with three terminals, an anode, a cathode and a gate. The device is turned on by applying a short pulse across the gage and the anode. Once the device turns on, the gate loses its control to turn off the device. The turn-off is achieved by applying a reverse voltage across the anode and the cathode. A novel SCR gate firing circuit 38 having isolated outputs is connected to the gates of each of the devices 26, 28, 30 and 32 to turn on such devices. The pulses produced by the gate firing circuit 38 are determinable as to amplitude, width and delay for optimum application in the current limiter 10 as will be described later in greater detail.

Figure 2:
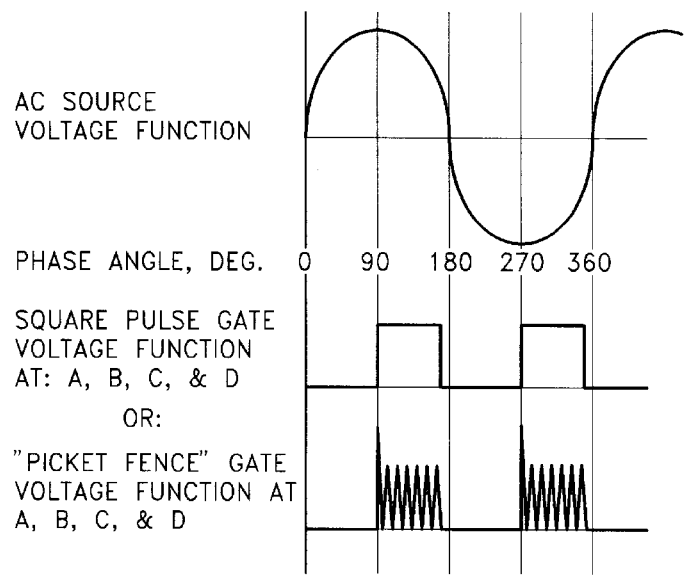
FIG. 2 is a timing and waveform diagram of the gate pulses applied by the gate firing circuit of FIG. 1 to the power semiconductor device bridge shown therein.

Referring now to the gate timing diagram of FIG. 2, the timing of the application of the gate pulses generated by the gate firing circuit 38 and applied to the SCR's 26,28,30 and 32 will be illustrated. In the past in the use of a thyristor bridge for current interrupting and current limiting, generation of gate pulses occurred upon turn ON and also upon sensing after a predetermined period of time that circuit interruption was desired or alternatively the fault current was to be limited. Such an arrangement required sensors and logic to determine which condition was presently existing and then to control the various curative approaches. Further, the arrangements of the past did not address restarting the thyristor bridge upon clearing of the fault.

The present invention, as seen in FIG. 2, provides for the pulses generated by the gate firing circuit 38 to be applied simultaneously to the gates of each of the devices 26, 28, 30 and 32 and also such pulses are applied twice during each cycle of the ac source 12. As is seen in FIG. 2, the ac source 12 provides a 60 Hz. wave form over a 360° cycle. The gate pulses may be square pulses or "picket fence" pulses as is commonly generated by present day circuits. As noted, the amplitude of such pulses may be determined by the gate firing circuit 38 and the timing delay of such pulses and the number of such pulses applied to the SCR's 26,28,30 and 32 are also determinable.

Applying the gate pulses simultaneously to each device 26,28,30 and 32 provides for the initial charging of the current limiting coil 34 during start up before steady state (non-fault) operation is achieved and also during the period immediately following clearing of a fault. The timing of the delay of the application of the gate pulses to the devices 26,28, 30 and 32 is also important in determining the amount of current limiting that may be provided by the invention 10. It has been found that the novel invention 10 provides maximum current limiting when the gate pulses are applied with a delay of 90° and a delay of 270° for each 360° cycle. By decreasing the timing delay of the gate pulses the amount of fault current limiting is found to be lessened. For a typical application of the invention 10 as a current limiter interposed between the secondary of a distribution transformer and a circuit breaker associated with a load it has been found that the invention provides a decrease of at least 30% from the initial fault current and this is believed to be very adequate for most applications.

Figure 3:
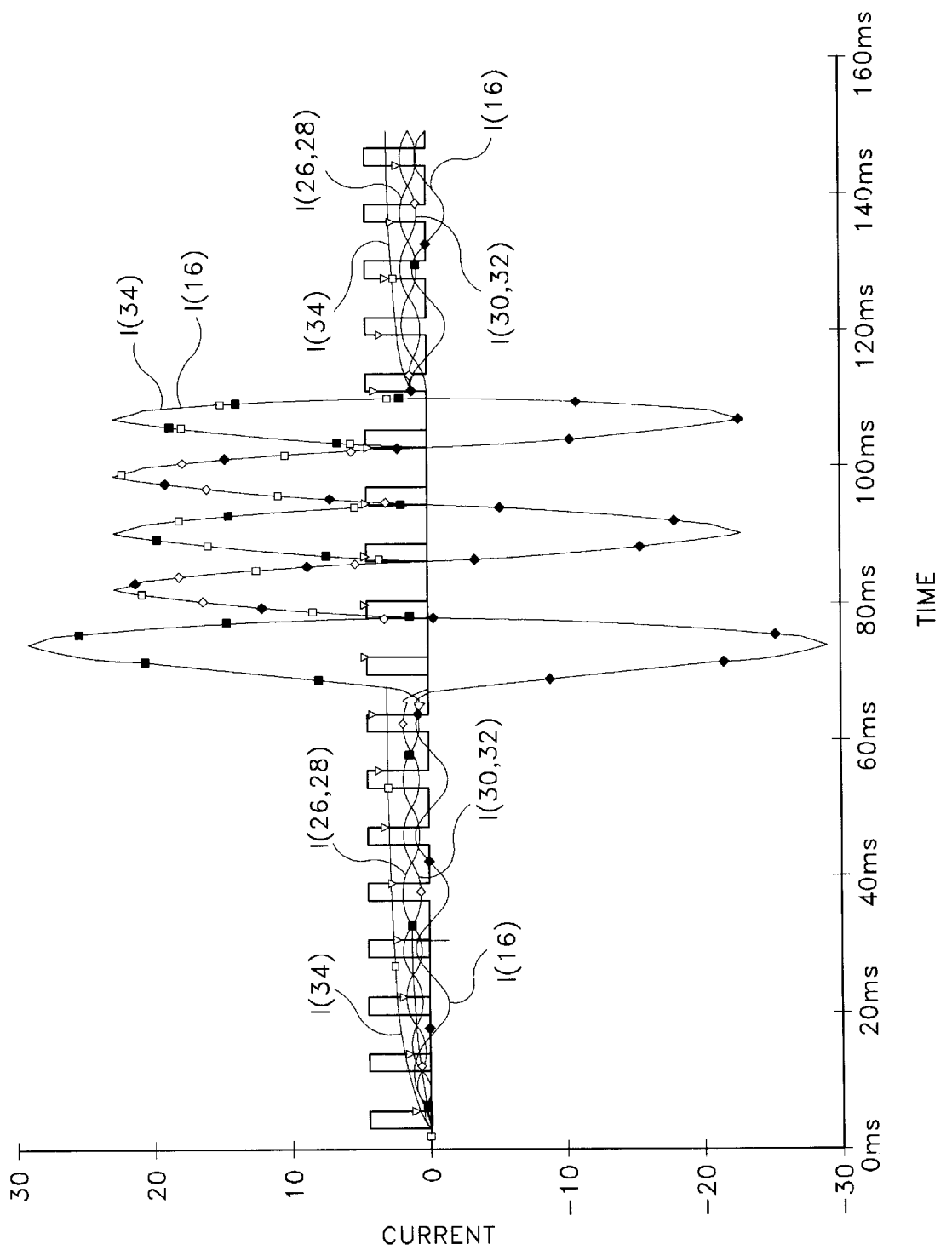
FIG. 3 is a simplified waveform diagram illustrating the application of gate pulses to the bridge during startup, a fault occurring, initial fault current, limited fault current, and restart following clearing of the fault.

Referring now to FIG. 3, the waveforms of the various currents involved will more graphically illustrate the efficiency of the invention 10. The waveforms commence at the leftmost portion of the x-axis which shows time in milliseconds while the y-axis illustrates values of involved electrical currents. Upon initial start up of the arrangement 10, the gate pulses generated by the pulse firing circuit 38 are applied to the gates of the SCR'S 26, 28, 30 and 32 to turn them on and to permit the dc bias supply 36 to forwardly bias such SCR's. Thus the current in the current limiting coil 34, represented by the waveform I(34) begins to rise swiftly since there is no need for additional sensors or logic to determine the status of various conditions and to determine what pulses should be generated.

Similarly, since the initial pulse to the gates of the devices 26, 28, 30 and 32 is of long enough duration to ensure that the devices are securely turned ON and stay ON the current I(26,28) flows through the bridge 24, as does the current I(30,32) that flows in a bidirectional manner to result in a steady state line current through the load of I(16), in the illustration of FIG. 3, in a very short time period which is illustrated as being around 30 ms., as determined by the current limiting coil and bias supply charging time constant. As noted previously, the gate pulses continue to be generated by the gate firing circuit 38 during steady state operation so no logic detector is required to turn them ON in a fault condition..

For illustrative purposes, FIG. 3 shows a fault occurring in the load 16 at around 65 ms. with an immediate increase in the current flowing through the bridge 24 with a high initial fault current that significantly exceeds the steady state load current. However, there is no need for time delaying sensors and logic to determine the nature of the fault and to commence to generate gate pulses with an appropriate delay based on whether it was desired to open the circuit or to limit the fault current.

In FIG. 3 it is seen that the initial fault current rises to a level exceeding the DC bias current I(34) which reversely biases SCR pairs 26 and 28 for one half cycle then SCR pairs 30 and 32 for the next half cycle, and so forth, thereby forcing the alternating current to flow through the large impedance of the current limiting coil 34 and reducing the fault current by a fraction or a certain per cent of the short circuit fault current. This limited fault current is maintained at this reduced level to enable the relays and other circuit breakers "downstream" to perform their function of clearing the fault promptly without triggering the main circuit breaker 22. Such a reduction in fault current would be adequate to permit the downstream protective devices the opportunity to perform their function and to thereby prolong the breaker 22 contact life and delaying the point at which the circuit breaker would need to be serviced.

In FIG. 3, it is presumed that the fault has been cleared and the continuing gate pulses applied to the gates of the SCR'S of the bridge 24 permit the current flowing through the coil 34 to quickly return to its steady state value. In the same manner, the currents I(26, 28) and I(30,32) return to the their normal values as does the load current I(16).

In the event that the downstream circuit breakers and other protective devices have failed to clear the fault during this predetermined time period, the gate pulse firing circuit 38 stops the generation of gate pulses. Stopping the generation of such pulses turns OFF one or both series pairs of SCR's and terminates the flow of load current I(16). Thus, the invention 10 automatically acts as a fault current limiter and only after a predetermined period of time to allow all downstream protective devices to clear the fault does the invention 10 act as a circuit breaker. It will be appreciated that in the event of a fault, the load current will be passing through the current limiting coil 34 and the predetermined period of time that can be set for reduced fault current before the load circuit is opened is established by the design and load carrying capacity of the current limiting coil 34 or in compliance with customer requirements..

Thus, the current limiter 10 by providing a continual double pulse function for the SCR bridge circuit permits the limiter 10 to operate properly in all of the usual operational modes. It permits prompt initial DC charging of the current limiting coil 34 with no AC load current and non-fault conduction of the AC at less than the maximum current limit. It also provides a desired current limiting under a fault condition to permit downstream protective devices a full opportunity to perform their function before as a matter of absolute necessity acting as a circuit breaker. The current limiter 10 also provides recovery of the DC current limiting coil current after the fault is cleared.

Figure 4:
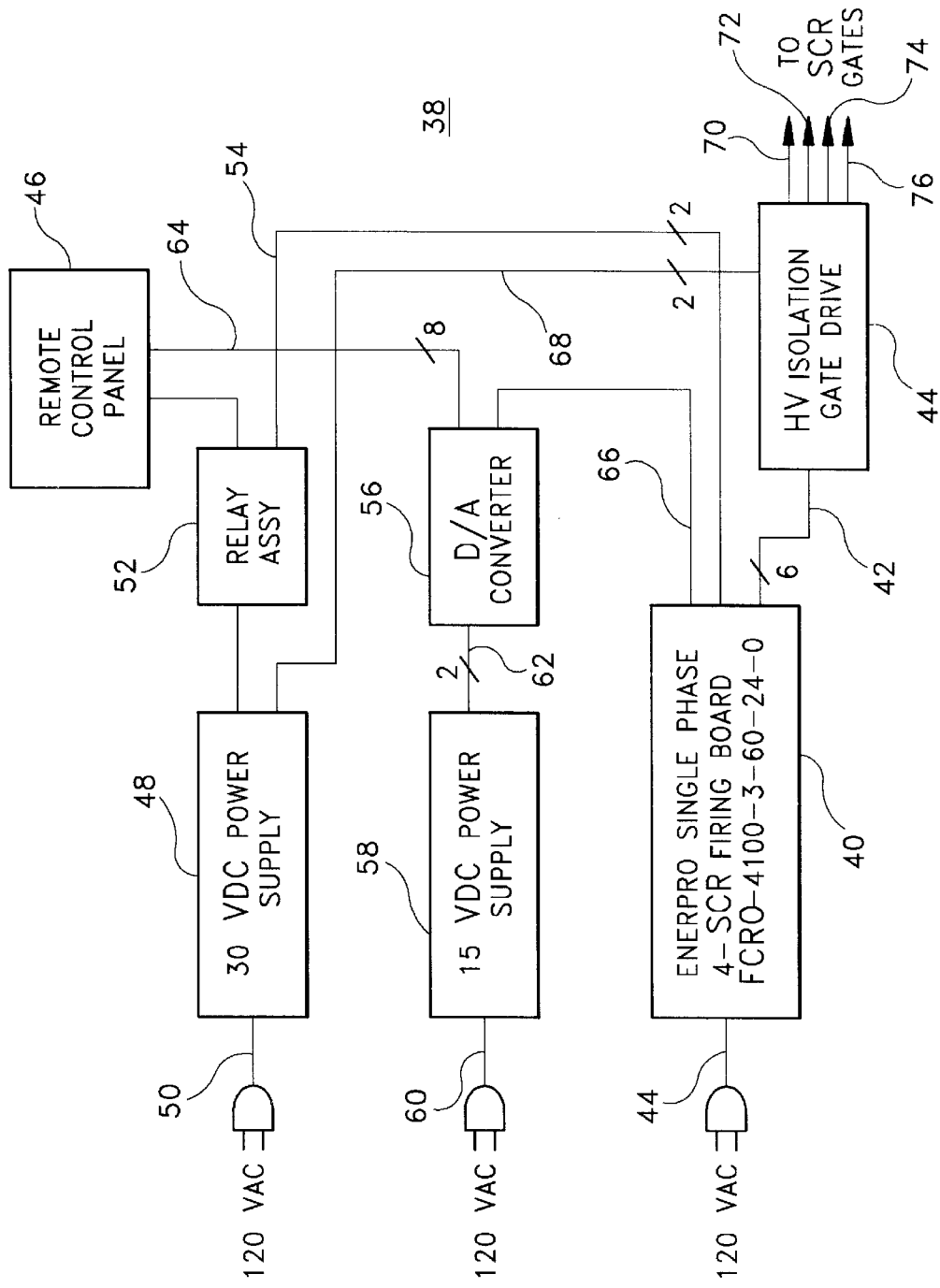
FIG. 4 is a simplified schematic of the gate firing circuit shown in FIG. 1.

Referring now to FIG. 4, an exemplary gate firing circuit 38 is illustrated. The circuit 38 includes a circuit 40 to generate on output 42 output pulses for application to the SCR's 26,28,30 and 32 via the high voltage isolation gate drive 44. The circuit 40 receives input power and timing reference from a 120 vac line connection. The circuit 40 is a single phase four SCR firing/regulator circuit board that generates four isolated and 180° spaced hard-firing gate pulse output signals. The gate drive outputs are pulse transformer coupled. An exemplary circuit board is Part Number FCRP4100 made by ENERPRO, INC. of Goleta, Calif. which can provide "picket fence" waveform pulses as seen in FIG. 2. A remote control panel 46 is provided with a plurality of switches to control the width of the gate pulses and the timing delay of such pulses as well as shut OFF gate pulses manually or automatically after a predetermined time before acting as a circuit breaker. And, as a practical matter, the physical capabilities of the equipment as designed are also determinative. A 30 VDC power supply 48 receives input power at 120 vac on input 50 and provides 30 VDC power to a relay assembly 52. The remote control panel 46 is coupled to the relay assembly 52 which in turn is connected to the firing board circuit 40 through a two conductor cable 54 so that the setting of the switches in the panel 46 enables the turning on and off of the gate pulses through the relay assemble 52 operatively coupled to the firing board 40.

A digital to analog (D/A) converter 56 receives 15 VDC power from power supply 58 fed by a 120 vac connection 60 and provides requisite power on a two conductor cable 62 to the D/A converter 56. The remote control panel 46 is coupled by means of an eight conductor cable 64 to the D/A converter 56 whereby the delay interval for the gate pulses is determined by the switches of the panel 46 that is connected to the D/A converter 56 and through conductor 66 connected to the gate pulse firing board 40.

The connection of the firing board 40 to the HV isolation gate drive circuit 44 then provides as input to the circuit 44 the six signals consisting of power, ground, and the four gate signals that are firing two pulses at 90° and two pulses at 270° to each gate as shown in FIG. 2. The HV isolation gate drive circuit 44 receives power from the 30 VDC power supply 48 via two conductor cable 68 and increases the voltage and current of the gate pulses received from the firing circuit 40. The HV isolation gate drive then provides on outputs 70, 72, 74 and 76 the gate pulses shown in FIG. 2 which are illustrated as being delayed 90° and 270°. The outputs 70, 72, 74 and 76 are connected to the gates of the power semiconductor devices 26, 28, 30 and 32 respectively. In addition to increasing the voltage and power of the gate pulse signals received from the firing pulse generating circuit 40 the HV isolation gate drive 44 provides electrical isolation from the low voltage control circuits of the SCR gate firing circuit 38.

The foregoing has illustrated how the current limiter of the present invention is particularly adapted to fulfill an exemplary purpose in the protection and coordination of an electric power system by minimizing the area of a possible power outage in case of a short circuit. The novel current limiter is particularly adapted for positioning at a substation between the transformer and the circuit breaker associated with a load. The current limiter in the event of a fault occurring in the load circuit limits the fault current for a predetermined period of time to permit the downstream protective devices to clear the fault in their allotted time and then acts as a circuit breaker only when the fault current persists. In particular, the novel current limiter operates properly in all of its operational modes, namely the initial DC charging of the current limiting coil with no AC load current and non-fault conduction of AC load current less than the maximum current limit. It further provides current limiting under the fault condition for a predetermined period of time before acting as a circuit breaker and prompt recovery of the DC current limiting coil current after the fault is cleared.

While the invention has been described with particular reference to a single phase electrical system, it is obvious that it would be equally applicable to a typical three phase system.

The present disclosure includes that contained in the appended claims as well as that of the foregoing description. Although this invention has been described in its preferred form with a certain degree of particularity, it is understood that the present disclosure of the preferred form has been made only by wary of example and numerous changes in the details of construction and combination and arrangement of parts and method steps may be resorted to without departing from the spirit and scope of the invention. For example, while a particular gate pulse firing circuit arrangement has been disclosed it would be well within the scope of the invention to provide a microcontroller that would perform certain of the functions disclosed in the illustrated arrangement.

What is claimed is:

1. An arrangement to limit current through a load circuit that is supplied electrical current from an ac source having a source impedance in the event of a fault occurring in the load circuit for a predetermined time in order to permit the fault to be cleared before acting as a circuit breaker to disconnect the load circuit, said arrangement comprising:

a power semiconductor device bridge circuit interposed between the ac source and the load circuit, said power semiconductor device bridge having four legs and four nodes with a first node thereof connected to said ac source and a second node connected to said load, and each power semiconductor device having a gate for application of an electrical pulse thereon to turn on such device;

a superconducting coil means having an impedance as least as large as the ac source impedance;

a dc source connected in series with said superconducting coil means between a third and a fourth node of said power semiconductor bridge, said dc source having such voltage and current levels as to forward bias each leg of said power semiconductor device bridge sufficiently to permit bidirectional current flow therethrough at a desired maximum current level generated by said ac source, and a continuously running gate pulse generating means coupled to the gate of each power semiconducting device of said bridge for application of a gate pulse to the gate of each power semiconductor device twice during each power cycle of said ac source, to readily accomplish the initial charging of the superconducting coil means with no ac load current and to promptly provide for recovery charging of the superconducting coil current after clearing of the fault.

2. The arrangement of claim 1 further includes determinable control means coupled to the gate pulse generating means for controlling the width of each gate pulse applied to a power semiconductor device.

3. The arrangement of claim 2 wherein said determinable control means is variable to delay the timing of the application of each of the two gate pulses during each cycle to the gate of each power semiconductor device to provide for limiting fault current in such bridge circuit for a predetermined time period in the event of a fault to permit the fault to be cleared prior to the opening of the circuit by terminating the generation of the gate pulses.

4. The arrangement of claim 3 wherein the determinable control means varies the width of each gate pulse and varies the timing delay of each gate pulse to provide a predetermined amount of current limiting through said bridge circuit.

5. The arrangement of claim 3 wherein the determinable control means delays the timing of the two gate pulses applied in each cycle to each power conversion device sufficiently to limit the fault current to a predetermined fraction of a maximum fault current required to disconnect the load circuit.

6. The arrangement of claim 3 wherein the determinable control means delays the timing of the two gate pulses applied in each cycle to each power conversion device sufficiently to limit the fault current to at least 70% of a maximum fault current required to disconnect the load circuit.

7. The arrangement of claim 3 wherein the control means is variable to delay for each power semiconductor device the timing of the first gate pulse from 0–90% of the cycle and to delay the timing of the second gate pulse 180° from the first gate pulse to provide the second gate pulse at 180°–270° of the cycle.

8. The arrangement of claim 3 wherein the determinable control means is variable to delay the first and second gate pulses 90° and 270° of the cycle to provide optimum reduction of the fault current flowing through the bridge.

9. The arrangement of claim 3 wherein the ac current source is a step down 67 kV/12 kV transmission/distribution transformer and the arrangement provides, upon occurrence of a fault, for at least a 400 msec. time period for reduction in fault current from the initial fault current to provide an opportunity for such fault to be cleared before the circuit is interrupted.

10. The arrangement of claim 3 wherein each gate pulse has a square wave form.

11. The arrangement of claim 3 wherein each gate pulse has a recurring picket fence appearing waveform.

12. The arrangement of claim 3 wherein the determinable control means includes means to generate spaced gate pulses for application to each power semiconductor device of said bridge, and determinable switch means coupled to the gate pulse generating means to control the parameters of the generated gate pulses and the time period such pulses will continue to be generated after a fault occurs.

13. The arrangement of claim 12 wherein the determinable control means further includes amplification means coupled to an output of the gate pulse generating means and to each power semiconductor device for providing increased power for each gate pulse and to provide electrical isolation of the pulse generating means from the power semiconductor devices of the bridge.

14. The arrangement of claim 1 wherein the power semiconductor devices are silicon controlled rectifier (SCR) devices.

15. An electrical current limiting arrangement adapted to be interposed between an ac source having a source impedance provided by the secondary of an electrical distribution transformer and a load impedance having at least one serially connected circuit breaker interposed therewith, said arrangement comprising:

a power semiconductor device bridge means having at least one power semiconductor device in each leg and having two nodes connected serially between the electrical transformer and the two opposing nodes having a large, in respect to the source impedance, impedance connected there across;

an electrical means connected in series with said large impedance and said power semiconductor device bridge to charge the large impedance and to forward bias such power semiconductor devices, gate circuit drive means to continuously provide double pulses during each power ac cycle to each power semiconductor device to turn ON each power semiconductor device to permit a predetermined level of bidirectional current generated by the ac source to flow therethrough to flow through such bridge, and control circuit means coupled to the gate circuit drive means to control the timing and delay of such double pulses to each power semiconductor whereby, in the event of a fault occurring in association with the load impedance, to reduce the initial fault current level to a predetermined fraction of such initial fault current.

16. The arrangement of claim 15 wherein the fault current is reduced for a sufficient time to permit downstream protective devices to be cleared prior to the opening of the circuit.

17. The arrangement of claim 15 wherein the gate circuit drive means includes pulse generating means which continuously generates a train of spaced gate pulses have a predetermined waveform, and a control means to vary the parameters of such pulses.

18. The arrangement of claim 16 wherein the gate pulses have a picket fence waveform.

19. The arrangement of claim 16 which further includes the gate circuit drive means comprising pulse generating means for suitable amplification of the gate pulses to provide four gate pulse signals for application to the bridge circuit at 90° and 270° delays of the cycle of the ac source, and to provide electrical isolation from low voltage control circuits of the control circuit means.

20. The arrangement of claim 15 wherein the control circuit means is operable to direct the gate circuit drive means to continue to generate pulses for a predetermined time period after occurrence of a fault in the load circuit.

21. The arrangement of claim 15 wherein the control circuit means is operated to direct the gate circuit drive means to continue to generate pulses for a determinable time period following occurrence of a fault in the load circuit to permit protective devices positioned in the load circuit to clear the fault and thereafter to direct the gate circuit drive means to suspend generation of pulses thereby turning OFF the power semiconductor bridge and opening the load circuit.

* * * * *